(12) United States Patent
Dibner

(10) Patent No.: US 7,862,268 B2
(45) Date of Patent: Jan. 4, 2011

(54) CARGO HOLDER FOR A VEHICLE

(76) Inventor: Ken Dibner, 19950 Harper, Harper Woods, MI (US) 48225

( * ) Notice: Subject to any disclaimer, the term of this patent is extended or adjusted under 35 U.S.C. 154(b) by 528 days.

(21) Appl. No.: 11/831,429

(22) Filed: Jul. 31, 2007

(65) Prior Publication Data

US 2008/0031700 A1 Feb. 7, 2008

Related U.S. Application Data

(60) Provisional application No. 60/820,995, filed on Aug. 1, 2006.

(51) Int. Cl.
*B60P 7/08* (2006.01)

(52) U.S. Cl. ............ 410/120; 410/32; 410/34; 410/97; 410/99; 410/121

(58) Field of Classification Search ............ 410/32, 410/34, 35, 41, 94, 96, 97, 99, 106, 115, 410/120, 129, 140, 155, 121; 296/26.08; 224/403, 404, 484, 493, 498, 525, 526, 531, 224/42.33, 565, 566, 572, 568; 248/499
See application file for complete search history.

(56) References Cited

U.S. PATENT DOCUMENTS

| | | | | |
|---|---|---|---|---|
| 518,207 | A | * | 4/1894 | Cassaday et al. ............ 410/34 |
| 1,705,381 | A | * | 3/1929 | Snyder ...................... 410/120 |
| 6,176,657 | B1 | * | 1/2001 | Romph ....................... 410/94 |

* cited by examiner

*Primary Examiner*—Stephen Gordon
(74) *Attorney, Agent, or Firm*—Gifford, Krass, Sprinkle, Anderson & Citkowski, P.C.

(57) ABSTRACT

A cargo securing apparatus for holding cargo to the bed of a vehicle such as a pickup truck includes a one-piece body and straps. The body has a first horizontally extending portion, a second vertically extending portion and a third angled portion. The horizontal portion extends either under or over the cargo. The vertical panel extends along the end of the cargo. Straps are used to secure the body to the vehicle.

7 Claims, 2 Drawing Sheets

CARGO HOLDER FOR A VEHICLE

CROSS-REFERENCE TO RELATED APPLICATIONS

This application claims priority of U.S. Provisional Patent Application Ser. No. 60/820,995 filed Aug. 1, 2006, which is incorporated herein by reference.

FIELD OF THE INVENTION

The application related to devices for securing cargo on the beds of motor vehicles.

BACKGROUND OF THE INVENTION

Pickup trucks are frequently used to haul long loads such a 4×8 sheets of plywood or rock lathe, 2×4s and the like. These loads typically have a length greater than the length of the truck bed and accordingly are supported on the truck bed with the tailgate in a lowered position. In order to prevent the leads from sliding off the back of the pickup truck during stopping or other maneuvers, it is necessary to use tie downs or other types of arrangements to prevent the cargo from sliding out the back. Accordingly it would be desirable to have a simple and inexpensive device for securing cargo on the beds of pickup trucks and trucks.

SUMMARY OF THE INVENTION

A cargo holder for use in securing cargo in a vehicle such as a pickup truck includes a body for engaging the cargo and straps for securing the body to the vehicle. The body includes a first panel which extends generally horizontally from a second vertical panel. A third panel extends from the top of the vertical panel at an angle away from the direction of the first panel. The apparatus may be used in different orientations. The first panel of the body may slide underneath the cargo or the body may be inverted with the first panel on top of the cargo and the second panel along the aft portion of the cargo. The angled portion permits use of straps with hooks.

BRIEF DESCRIPTION OF THE DRAWINGS

Advantages of the present invention will be readily appreciated by reference to the following detailed description when considered in connection with the accompany drawings wherein.

DETAILED DESCRIPTION OF THE PREFERRED EMBODIMENTS OF THE INVENTION

Figure 1:
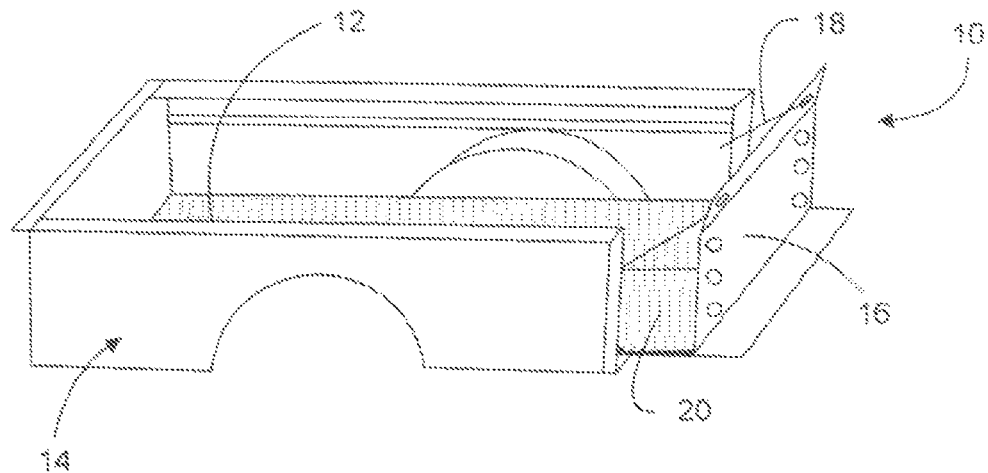
FIG. 1 is a perspective view of the cargo holder in use securing cargo in a vehicle.
Figure 2:
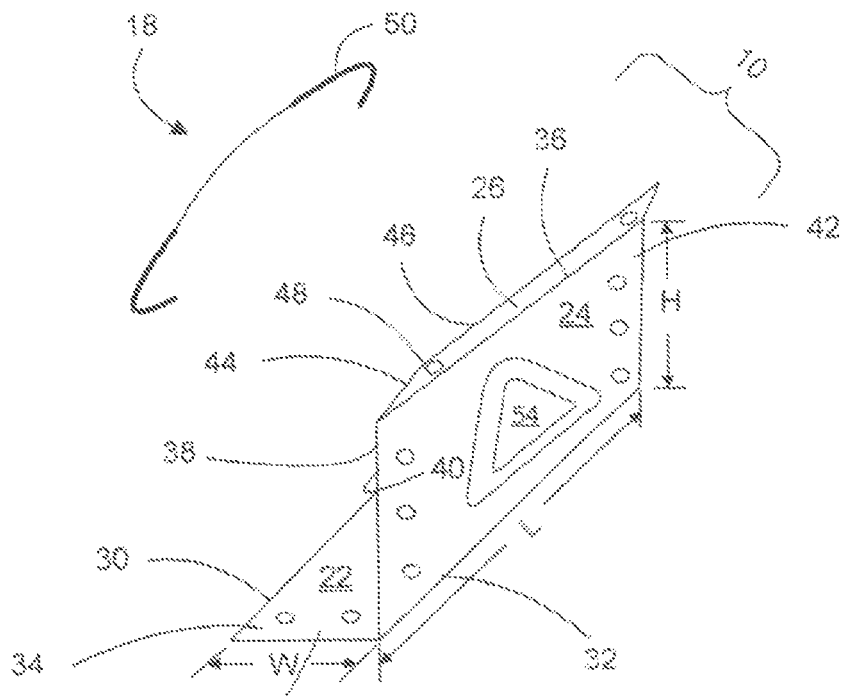
FIG. 2 is a perspective view of the body of the cargo holder.
Figure 3:
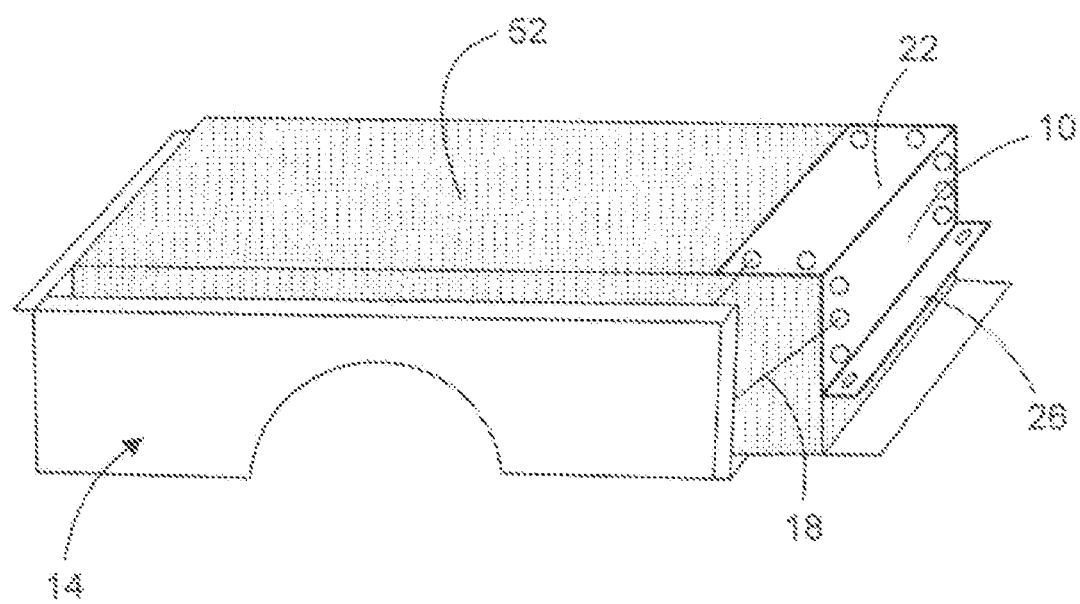
FIG. 3 is a perspective view of the cargo holder according to the present invention shown mounted in an inverted position.

As shown in FIGS. 1-3, a cargo holder 10 for use in securing cargo 12 to a vehicle such as a bed of a pickup truck 14. The cargo holder includes a body 16 and a pair of steps 18. The cargo holder is particularly useful for cargo 12 which has an end 20 which extends beyond the bed 14 of a pickup truck for cargo 12 such as 4×8 sheets of plywood, sheet lathe, large crates and lumber.

The body 16 includes a horizontally extending first panel 22, a second vertically extending panel 24 and an angled third panel 26. The first panel 32 22 has a pair of side edges 28 extending between a front edge 30 and a corner edge 32 from which the second panel 24 extends. A pair of apertures 34 is formed inwardly from each of the side edges 28. The panel has a width W of approximately 8 inches and a length L of approximately 3 feet.

The second panel 24 extends from the corner edge 32 to a longitudinal edge 36 a height H of approximately 10 inches. Three apertures 38 are formed inwardly approximately ¾ of an inch from each side edge of the second panel, and the second panel has an inner side 40 which abuts the end of the cargo and an outer side 42.

The third panel 26 extends at an angle of approximately 150 to 160 degrees from the outer side 42 of the second panel 24. The third panel 26 has a pair of side edges 44 and an outer edge 46. At least one aperture 48 is formed inwardly from each side edge. The third portion is angled to permit easy fastening of the straps 18 into the apertures without engaging or interfering with the cargo.

As shown in FIG. 2, flexible connecting members such as straps 18 are utilized to secure the body to the vehicle. In the preferred embodiment the straps 18 are a bungee cord and include hooks 50 on either end. However a variety of different straps may be used. The straps may be connected to the body by looping the straps in the apertures or connected by other types of connector fasteners. The strap may also be provided with adjustment buckles and the like.

In a preferred embodiment the cargo holder 10 is formed of a rigid moldable material such as fiberglass, carbon fiber, or ABS plastics. However, the cargo holder 18 may be alternatively formed of metal such as aluminum and stamped into shape. Finally, the cargo holder 10 may be formed of individual panels of rigid material, such as wood, which are held in the desired position by metal angles.

The cargo holder is used in several positions. As shown in FIG. 1, the apparatus may be placed with the first panel 22 extending under the end 20 of the cargo 12 being transported with the second panel 24 in abutment with the end 20 of the cargo. The straps 18 are hooked into the apertures in the angled portion or other panels an to the truck bed. Alternatively, as shown in FIG. 3, the cargo securing apparatus may be used with cargo such as a crate 52 which has a height greater than the distance between the edges. The body is inverted with the first panel 22 extending over the upper surface of the crate 52 and the second panel 24 in abutment with the end 20 of the cargo. Straps may be then attached to the holes in the first panel portion as well as in the angled panel to keep the cargo from sliding from the rear of the bed 14 of the vehicle. A warning reflector 54 may be mounted on the outer side 42 of the second panel.

Thus, describing our invention with respect to the preferred embodiments it will be apparent to those skilled in the art that other variations are within the scope of the invention.

The invention claimed is:

1. A cargo holder for use in securing cargo onto a vehicle, the cargo having an end, a bottom and a top, said cargo holder comprising:

a body having a first panel portion rigidly attached to and extending perpendicularly from a second panel portion;

said first panel portion having a front edge extending between a pair of spaced apart side edges, said second panel portion having a pair of spaced apart side edges and at least one aperture adjacent each of said second panel portion pair of spaced apart side edges; and at least two resilient flexible members, each of the two resilient flexible members having one end releasably connected to the vehicle and another end connected to each said aperture of said second panel portion, the second panel portion having an inner surface in abutment with the end of the cargo and the first panel portion extending on a generally horizontal plane under a portion of the bottom of the cargo or over a portion of the top of the cargo.

2. The cargo holder of claim 1 wherein the second panel portion has a pair of longitudinal edges extending between a pair of side edges.

3. The cargo holder of claim 2 wherein the body further comprises a third panel portion extending at a predetermined angle in a direction away from the inner surface.

4. The cargo holder of claim 3 wherein the first panel portion extends from one of the pair of longitudinal edges in a direction away from the third panel portion.

5. The cargo holder of claim 2 wherein the second panel portion has said at least one aperture adjacent each one of the second panel portion pair of side edges.

6. The cargo holder of claim 3 wherein the third panel portion has a pair of side edges and at least one aperture adjacent each one of the pair of side edges of the third panel portion.

7. The cargo holder of claim 1 wherein each of said flexible members has a hook at one end for engaging the body of the cargo holder.

* * * * *

UNITED STATES PATENT AND TRADEMARK OFFICE
CERTIFICATE OF CORRECTION

| | | |
|---|---|---|
| PATENT NO. | : 7,862,268 B2 | |
| APPLICATION NO. | : 11/831429 | |
| DATED | : January 4, 2011 | |
| INVENTOR(S) | : Ken Dibner | |

It is certified that error appears in the above-identified patent and that said Letters Patent is hereby corrected as shown below:

Column 1, line 21, replace "leads" with --loads--

Column 2, line 3, replace "32 22" with --22--

Signed and Sealed this
Nineteenth Day of July, 2011

David J. Kappos
*Director of the United States Patent and Trademark Office*